United States Patent [19]

Jung et al.

[11] Patent Number: 5,000,538

[45] Date of Patent: Mar. 19, 1991

[54] SPLICING OPTICAL FIBRES

[75] Inventors: Roger E. Jung, Chingford; John V. Smoker, London, both of England

[73] Assignee: Telephone Cables Limited, England

[21] Appl. No.: 463,272

[22] Filed: Jan. 11, 1990

[30] Foreign Application Priority Data

Jan. 13, 1989 [GB] United Kingdom ............... 8900788

[51] Int. Cl.$^5$ ............ G02B 6/26; G02B 6/36; C03C 25/02
[52] U.S. Cl. ..................... 350/96.21; 65/3.11
[58] Field of Search ........... 350/96.10, 96.15, 96.20, 350/96.21, 320; 65/3.11, 4.1, 4.2

[56] References Cited

U.S. PATENT DOCUMENTS

| | | | |
|---|---|---|---|
| 4,557,556 | 12/1985 | Decker, Jr. | 350/96.15 X |
| 4,688,882 | 8/1987 | Failes | 350/96.15 |
| 4,796,968 | 1/1989 | Coccoli et al. | 350/96.15 |
| 4,902,324 | 2/1990 | Miller et al. | 350/96.15 |

FOREIGN PATENT DOCUMENTS

| | | | |
|---|---|---|---|
| 0096910 | 5/1987 | Japan | 350/96.15 |
| 2136349 | 9/1984 | United Kingdom . | |

*Primary Examiner*—Akm Ullah
*Attorney, Agent, or Firm*—Kirschstein, Ottinger, Israel & Schiffmiller

[57] ABSTRACT

Method of splicing optical fibres having a glass core and at least one plastics cladding layer comprises: stripping the or each cladding layer from the fibre ends, fusion splicing the bare fibre ends, placing the splice region in an open channel of a flexible mould, the channel being of uniform section, filling the gap between the bare, splice region and the inner wall of the channel with a curable plastics material, closing the flexible mould so that the channel walls close together and assume an internal shape complementary to that of the cladding layer or layers whereby to expel the surplus plastics material, curing the plastics material remaining within the mould, and opening the mould.

8 Claims, 1 Drawing Sheet

SPLICING OPTICAL FIBRES

BACKGROUND OF THE INVENTION

This invention relates to a method of splicing optical fibres having a glass core and at least one plastics cladding layer, and to apparatus for use in such a method. The splicing method is especially useful in the jointing of optical fibre cable, for example submarine cable, in the factory

SUMMARY OF THE INVENTION

The purpose of the invention is to provide a simple apparatus for, and quick method of, splicing optical fibres, which reliably results in a splice of high strength and in which the resulting clad optical fibre has a uniform outer diameter even over the spliced region.

From a first aspect the invention comprises a flexible mould for reconstituting an outer plastics cladding layer on a splice region comprising the stripped, spliced ends of optical fibres, comprising a unitary plastics moulding having, generally parallel to a planar portion of the surface, a straight, uniform-section bore for accommodating the splice region, the entire length of the bore communicating with the planar portion of the surface by means of a longitudinal cut, the adjacent portion of the mould being capable of flexure to open the longitudinal cut and to broaden the uniform-section bore for access to its interior.

From a second aspect the invention comprises a method of splicing optical fibres having a glass core and at least one plastics cladding layer comprising: stripping the or each cladding layer from the fibre ends, fusion splicing the bare fibre ends, placing the splice region in an open channel of a flexible mould, the channel being of uniform section, filling the gap between the bare splice region and the inner wall of the channel with a curable plastics material, by applying the plastics material drop-wise over the splice region and ensuring that the gap is of such dimensions in relation to the viscosity of the plastics material that the plastics is distributed around the spliced ends by surface tension effects, closing the flexible mould so that the channel walls close together and assume an internal shape complementary to that of the cladding layer or layers whereby to expel the surplus plastics material, curing the plastics material remaining with the mould, and opening the mould.

This technique allows the cladding to be reconstituted around the bare splice region precisely to the diameter of the original cladding or other required diameter. Further, a splice of high mechanical strength is ensured by fusion splicing together the fibre ends which have been stripped of their cladding.

The plastics material is preferably cured by exposure to ultra-violet light.

According to a further aspect, the invention provides a method of joining optical fibre cable, comprising separating out from each cable at least one optical fibre tube containing one or more plastics clad optical fibres, exposing the fibre or fibres, and splicing at least one such pair of optical fibres using the method in accordance with the invention described above, and finally reconstituting the cable.

BRIEF DESCRIPTION OF THE DRAWINGS

One way of performing the method of the invention, using a mould embodying the invention, will now be described by way of example only, with reference to the accompanying schematic drawings, of which.

DETAILED DESCRIPTION OF THE PREFERRED EMBODIMENT

Figure 1:
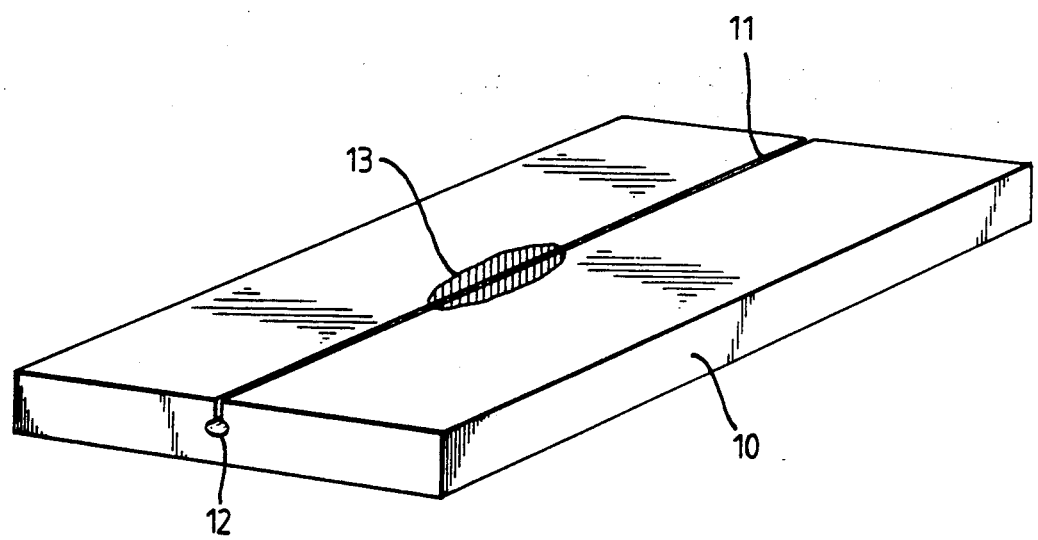
FIG. 1 is a perspective view of a plastics mould embodying the invention.
Figure 2:
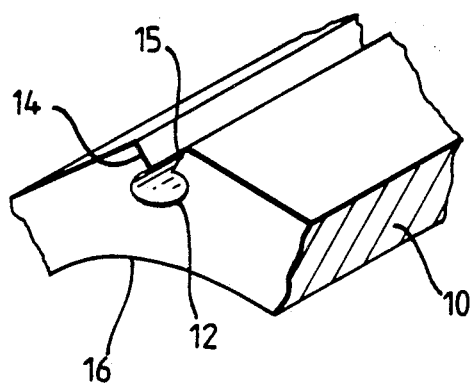
FIG. 2 is a corresponding perspective view to an enlarged scale of a portion only of the mould of FIG. 1, in its open configuration.

The unitary plastics flexible mould 10 illustrated in FIGS. 1 and 2 is formed of a clear flexible material. It is laminar, and is formed with a straight, uniform-section bore 12 parallel to its upper planar surface and communicating with that surface through a planar cut 11 normal to the surface In the closed configuration illustrated in FIG. 1 the bore 12 is cylindrical.

The mould 10 is flexible, and is capable of being flexed along a central portion 16 adjacent to the longitudinal bore 12, as shown in FIG. 2. In its open configuration, the side walls 14, 15 of the cut 11 are separated, and the bore 12 is broadened, allowing access from the exterior to the interior of the bore. The cross-section of the interior of the mould is thus cylindrical in its closed configuration shown in FIG. 1, but key-hole-shaped in its open configuration shown in FIG. 2.

The use of this mould in the splicing of optical fibres will now be described. The optical fibres to be spliced may have any number of cladding layers over a glass core, but for the purposes of this description it is assumed that only a primary plastics cladding layer or coating remains on each optical fibre.

A length of 25 mm at the end of each fibre is stripped mechanically of its primary cladding, to leave exposed the bare glass core which comprises at least two layers of glass of different refractive indices. These exposed ends are cleaned ultrasonically in agitated solvent, and are then each cleaved in a cleaver, the primary coating being gripped in a clamp. The exposed ends are cleaved to leave a specific length of bare glass core still exposed. The end face must be controlled to lie within one degree of the plane perpendicular to the fibre axis.

The exposed fibre ends are cleaned in an ultrasonic cleaning tank with clean solvent, ensuring that the fibre does not touch the container. The cleaned, cleaved fibre ends are then transferred to a conventional fusion machine in which they are clamped by their primary coatings, ensuring that the exposed ends do not come into contact with anything. The fusion machine is then operated to fuse together the exposed ends, splicing the fibres together.

The steps of stripping the primary coating, cleaning the bare fibre, cleaving the fibre end, cleaning the end once again and transferring the fibre end to the fusion machine, may be performed simultaneously on both optical fibres, or alternatively may be performed in sequence.

After cleaning the mould of FIG. 1 thoroughly with a solvent and blowing dry with an air duster, the spliced optical fibres are removed from the fusion machine and are located on a moulding jig (not shown) associated with the mould 10.

The mould 10 is opened, and the spliced portion of the optical fibre is located within the bore 12 using a clean spatula, arranging the spliced portion with its primary cladding layer removed to lie centrally of the mould 10. A slight tension is applied to the fibre, to ensure that it is straight.

A U-V curable coating material, compatible with the fibre cladding, is applied drop-wise using a syringe onto the spliced portion of the optical fibre, allowing the coating material to flow into the mould by capillary action. The gap between the spliced portion of the optical fibre stripped of its primary cladding and the inner wall of the bore 12 is completely filled by the coating material, the dimensions of the gap being controlled to ensure that this occurs. However, the presence of any air bubbles or voids should be checked, and remedied by careful application of further coating material. The coating material is allowed to flow over the surface of the mould 10, as shown in FIG. 1 at 13, ensuring an air-tight seal. The region 13 of application of the coating material is slightly longer than the length of fibre whose glass core is exposed, some of the coating material being allowed to flow over the primary cladding layer.

The mould 10 is then closed, to assume the configuration shown in FIG. 1, causing the surplus material to be expelled from the interior of the mould onto the surface 13. In the closed configuration, the internal surface of the bore 12 is complementary to the surface of the primary cladding of the optical fibres, so that closing the mould has the effect of driving the excess material from the surface of the primary cladding, and reconstituting the exposed glass core with the coating material with a matching external diameter.

A high intensity beam from an ultra-violet lamp is passed up and down the moulded area 13 for a period of time to cure the material. The excess material is then removed from the surface 13 of the mould 10 with a clean spatula, and the surface of the mould 10 is cleaned with solvent.

The mould ID is then opened, and the spliced optical fibres are removed from the mould, tested for any voids in the reconstituted layer, removed from the moulding jig and proof tested by applying a predetermined tension sufficient to extend the optical fibre length by a specific percentage.

This technique may be used in the jointing of optical fibre cable, for example submarine cable. In such cable, the individual clad optical fibres are usually accommodated in flexible tubes. In order to join two such cables, the unit tubes are separated, and unit cutters are used to expose a length of optical fibre from each unit. The first section of each unit is then clamped to a jig, and then the ends of the optical fibres are cut to leave a specific length projecting from their corresponding units.

The individual pairs of optical fibres are then spliced using the method described above, leaving them with their outer diameter reconstituted by means of the coating material.

A predetermined length of split unit tubing is then fitted over the spliced fibre, ensuring that the separation between the unit tubes is adjusted to give the correct amount of fibre overfeed. A length of heat shrink tubing, previously passed over the unit tube, is then placed evenly over the jointed area and shrunk down to hold the longitudinally-split tube and unit ends in place. This provides a nominally uniform diameter joint across the cable unit.

We claim:

1. A flexible mould for reconstituting an outer plastics cladding layer on a splice region between two optical fibres, each having a glass core and at least one cladding layer, said optical fibres having ends stripped of said at least one cladding layer and spliced together at the splice region, said flexible mould comprising:
    (a) a unitary body moulded from a flexible plastics material and having at least one planar surface portion;
    (b) a uniform-section bore formed in said body and having a length extending along a longitudinal direction which is generally parallel to said planar portion, said bore having an interior for accommodating said spliced ends; and
    (c) a longitudinal cut extending along the entire length of said bore and providing communication between said bore and said planar portion;
    (d) said body having flexible portions lying on either side of said longitudinal cut, said flexible portions being movable apart to open said longitudinal cut to gain access to the interior of said bore.

2. A mould according to claim 1, wherein said body is constituted of a plastics lamina.

3. A mould according to claim 2, in which the bore extends through the entire length of the lamina.

4. A mould according to claim 3, in which the cut is normal to the planar surface portion.

5. A mould according to claim 4, in which the flexible portions normally lie in a closed configuration, and in which the bore is cylindrical in the closed configuration.

6. A method of splicing optical fibres, each having a glass core, at least one plastics cladding layer, and an end, comprising the steps of:
    (a) stripping said at least one cladding layer from the ends of the fibres to form bare fibre ends;
    (b) fusion splicing said bare fibre ends to form a bare splice region;
    (c) placing said bare splice region in an open channel of uniform section in a flexible mould having channel walls that move apart in an open configuration and that move toward each other in a closed configuration, said open channel having an interior that forms a gap with said bare splice region;
    (d) filling said gap between said bare splice region and the interior of said open channel with a curable viscous plastics material, by applying said curable viscous plastics material drop-wise over said bare splice region so that said curable plastics material is distributed around said spliced ends by surface tension effects;
    (e) closing said flexible mould so that said channel walls are moved to the closed configuration and assume an internal contour complementary to that of said at least one cladding layer whereby surplus of said curable viscous plastics material is expelled from the channel;
    (f) curing said curable viscous plastics material remaining within said channel; and
    (g) opening said mould by moving said channel walls to the open configuration.

7. A method according to claim 6, in which the curing step is performed by exposure to ultra-violet light.

8. A method of joining optical fibre cable, comprising the steps of:
    (a) separating out from each cable at least one optical fibre tube containing at least one plastics clad optical fibre;
    (b) exposing said at least one fibre;
    (c) splicing at least one such pair of optical fibres using the method according to claim 6; and
    (d) finally reconstituting the cable.

* * * * *